US012545553B2

(12) United States Patent
Aitamurto et al.

(10) Patent No.: US 12,545,553 B2
(45) Date of Patent: Feb. 10, 2026

(54) METHOD FOR TESTING A BRAKE OF A HOISTING MACHINE AND SYSTEM

(71) Applicant: KONE Corporation, Helsinki (FI)

(72) Inventors: Juha-Matti Aitamurto, Helsinki (FI); Alessio Calcagno, Helsinki (FI); Lauri Stolt, Helsinki (FI)

(73) Assignee: KONE Corporation, Helsinki (FI)

( * ) Notice: Subject to any disclaimer, the term of this patent is extended or adjusted under 35 U.S.C. 154(b) by 825 days.

(21) Appl. No.: 17/941,499

(22) Filed: Sep. 9, 2022

(65) Prior Publication Data

US 2023/0007842 A1 Jan. 12, 2023

Related U.S. Application Data

(63) Continuation of application No. PCT/EP2021/068839, filed on Jul. 7, 2021.

(51) Int. Cl.
*B66B 1/02* (2006.01)
*B66B 5/00* (2006.01)
*B66B 5/02* (2006.01)

(52) U.S. Cl.
CPC .......... *B66B 5/0093* (2013.01); *B66B 5/0031* (2013.01); *B66B 5/02* (2013.01); *B66B 2201/24* (2013.01)

(58) Field of Classification Search
CPC ........ B66B 5/0093; B66B 5/0031; B66B 5/02
(Continued)

(56) References Cited

U.S. PATENT DOCUMENTS

2017/0101289 A1* 4/2017 Stolt .......................... B66B 1/32
2023/0150794 A1* 5/2023 Salomaki .............. B66B 1/3407
187/393

FOREIGN PATENT DOCUMENTS

EP 1 701 904 A2 9/2006
EP 1 915 311 B1 12/2010
(Continued)

OTHER PUBLICATIONS

International Search Report, issued in PCT/EP2021/068839, dated Mar. 29, 2022.
(Continued)

*Primary Examiner* — Erick D Glass
(74) *Attorney, Agent, or Firm* — Birch, Stewart, Kolasch & Birch, LLP

(57) ABSTRACT

A method for testing an elevator hoisting machine brake with a preselected test load TL includes confirming empty elevator car positioned at a test location $s_{test}$; obtaining information of elevator balancing B; obtaining information of friction $F_r$ of the elevator at the test location $s_{test}$; determining required assisting test torque $T_M$ of a hoisting machine motor based on said test load TL, balancing B and friction $F_r$; opening one of the brakes while keeping rest of the brakes engaged in braking position, applying torque with the motor at most up to the required test torque $T_M$, measuring movement of the elevator car, and if movement of the elevator car was detected, generating a signal indicating degraded condition of one or more hoisting machine brakes.

20 Claims, 2 Drawing Sheets

(58) Field of Classification Search
USPC .......................................................... 187/391
See application file for complete search history.

(56) References Cited

FOREIGN PATENT DOCUMENTS

| | | | |
|---|---|---|---|
| EP | 3 280 888 | B1 | 7/2019 |
| WO | WO 2005/066057 | A2 | 7/2005 |

OTHER PUBLICATIONS

Written Opinion of the International Searching Authority, issued in PCT/EP2021/068839, dated Mar. 29, 2022.

* cited by examiner

METHOD FOR TESTING A BRAKE OF A HOISTING MACHINE AND SYSTEM

CROSS REFERENCE TO RELATED APPLICATIONS

This application is a Continuation of PCT International Application No. PCT/EP2021/068839, filed on Jul. 7, 2021, which is hereby expressly incorporated by reference into the present application.

BACKGROUND OF THE INVENTION

Field of the Invention

The invention relates to a method for testing an elevator hoisting machine brake and to a system for implementing the method. In general, the invention relates to ensuring sufficient braking effort of a hoisting machine brake.

Description of the Prior Art

Elevators have electromechanical hoisting machine brakes as safety devices to apply braking force to a traction sheave or a rotating axis of an elevator hoisting machine. There are normally at least two separate brake units, such as two, three or four units. They shall be dimensioned to stop and hold standstill an elevator car with an overload. If one brake unit fails, for safety reasons the remaining ones should still stop and hold an elevator car with suitable safety margin.

Due to their characteristics as elevator safety devices, operating condition of the hoisting machine brakes shall be confirmed.

One confirmation method is disclosed in EP 1915311 B1. According to the method, only one holding brake of the elevator hoisting machine is engaged at the end of elevator run, and motor torque is removed. If traction sheave starts moving due to the gravity effect, holding brake is considered defective.

There is a need for enhanced test methods, to get the brakes accurately tested in their entire operational range.

SUMMARY OF THE INVENTION

The object of the invention is to introduce a method which is capable of testing sufficiency the braking effect, particular the braking torque of an elevator hoisting machine brake, by using a test load with improved accuracy.

Advantageously the test load is established by complementing the load caused by elevator unbalance with an assisting motor torque of an elevator hoisting machine.

Assisting motor torque includes components selected to compensate against the unidealities of real-life elevator systems. Therefore, assisting motor torque provides for accurate testing of the hoisting machine brakes.

An object is to introduce a solution by which one or more of the above defined problems of prior art and/or drawbacks discussed or implied elsewhere in the description can be solved. An object is particularly to introduce a solution by which testing of hoisting machine brakes can be provided accurately and simply.

It is brought forward a new method for testing an elevator hoisting machine brake with a preselected test load TL, which method comprises:

- confirming empty elevator car positioned at a test location $s_{test}$,
- obtaining information of elevator balancing B,
- obtaining information of friction $F_r$ of an elevator at the test location $s_{test}$,
- determining required test torque $T_M$ (assisting motor torque) of a hoisting motor based on said test load TL, balancing B and friction $F_r$,
- opening one of the hoisting machine brakes while keeping rest of the brakes engaged in braking position,
- applying torque with an electrical motor of the elevator hoisting machine at most up to the required test torque $T_M$,
- measuring movement of the elevator car, and
- in movement of the elevator car was detected, generating a signal indicating degraded condition of one or more hoisting machine brakes.

Preferable further details of the method are introduced in the following.

According to some embodiments the method is repeated for each hoisting machine brake by keeping it open while keeping the rest of the brakes engaged in braking position.

According to some embodiments the test load TL corresponds to a preselected overload, which is represented by a factor OL as follows TL=OL*N, wherein N is a nominal load N of the elevator car, and preferably OL is selected from range 101% . . . 130%, more preferably 105% . . . 120%, most preferably OL=110%.

Preferably the elevator comprises:

- an elevator car, a counterweight and elevator ropes arranged movably within a hoistway, wherein the elevator car and the counterweight are supported at least partially by means of the elevator ropes; and
- a hoisting machine, which comprises
  - a motor and a traction sheave connected to the motor for moving the elevator car and the counterweight via the elevator ropes; and
  - at least two brakes, which are arranged to stop and prevent the elevator car from moving when the elevator is stopped.

According to some embodiments measuring the movement of the elevator car is implemented by measuring rotation of the elevator hoisting machine, preferably measuring movement of the motor or the traction sheave connected to the motor and supporting the elevator ropes for moving the elevator car. The motion information of the elevator car for the drive unit may be obtained from a rotation sensor or a resolver connected to the motor or from a positioning device connected to the elevator car or located in the hoistway.

Preferably the hoisting machine motor is a synchronous permanent magnet motor.

It is also brought forward a new system for implementing the inventive method. The system may be a part of an elevator drive unit or provided separately. The system may be implemented in a hardware and/or software module of the elevator drive unit and/or in an elevator maintenance or installation tool to install or service the elevator.

According to an embodiment, the elevator drive unit comprises an elevator hoisting motor, preferably a synchronous permanent magnet motor, and a frequency converter configured to drive the motor.

According to some embodiments the system has an input for the motor current fed to the motor and an input for the car location, the inputs being connectable to the elevator drive unit.

BRIEF DESCRIPTION OF THE DRAWINGS

In the following the present invention will be described in closer detail by way of example and with reference to the attached drawings, in which.

DETAILED DESCRIPTION

Figure 1:
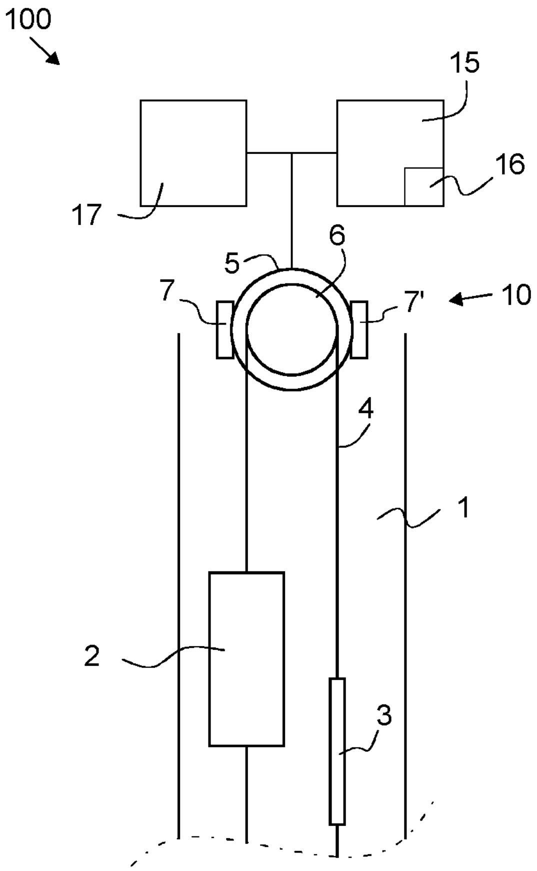
FIG. 1 shows schematically an embodiment of an elevator system comprising at least two brakes.

FIG. 1 shows an elevator 100 with an elevator car 2 and a counterweight 3 arranged movably within a hoistway 1. The elevator car 2 and the counterweight 3 are supported at least partially by means of elevator ropes 4. The elevator car 2 and the counterweight 3 are driven by a motor 5 of a hoisting machine 10. In addition to the motor, the hoisting machine comprises a traction sheave 6 which is connected to the motor for moving the elevator car and the counterweight via the elevator ropes. The hoisting machine 10 comprises at least two brakes 7, 7', such as two, three or four brakes 7, 7', which are arranged to stop and prevent the elevator car from moving when the elevator is stopped.

The traction sheave 6 may be integrated to the motor 5 or connected to it in a suitable manner. Preferably the motor 5 is a synchronous permanent magnet motor. Preferably the brakes 7, 7' are electromagnetic brakes which are arranged for example to press a braking shoe against a braking surface connected to the traction sheave 6 or separately from the traction sheave.

The motion of the motor can be controlled with a drive unit 15 as shown in FIG. 1. As FIG. 1 illustrates, a braking controlling system for testing sufficiency of the braking effect may be implemented in a hardware and/or software module 16 of the elevator drive unit 15 and optionally in an elevator maintenance or installation tool 17. Preferably the system has an input for the motor current fed to the motor 5 and an input for the car 2 location s, the inputs being connectable to the elevator drive unit 15.

Figure 2:
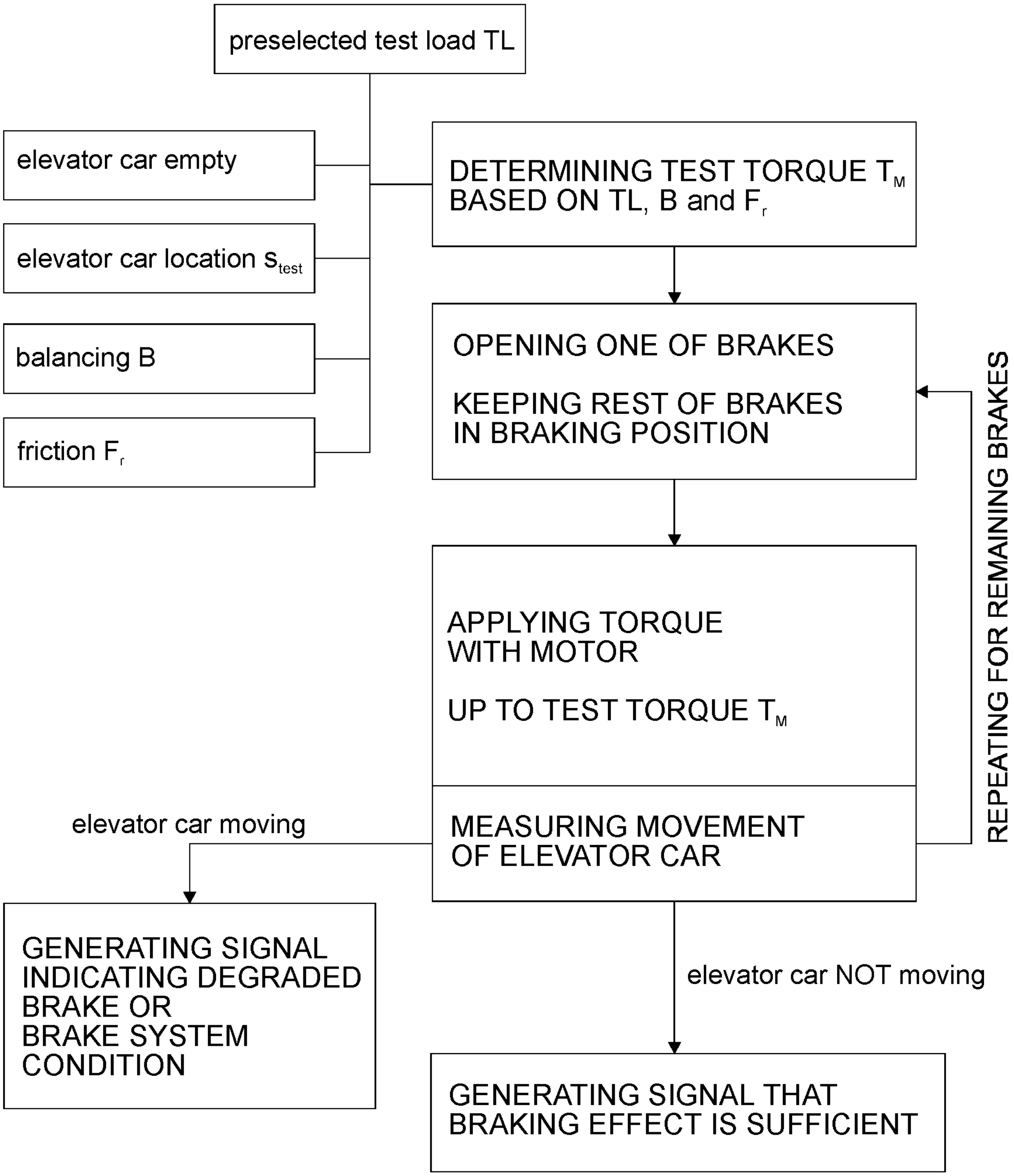
FIG. 2 shows an example of a preferred method.

As shown in FIG. 2, there is provided a method for testing hoisting machine 10 brakes 7, 7' with a preselected test load TL. A system for implementing the method for testing sufficiency of the braking effect may be a part of an elevator drive unit 15 or provided separately and may be a part of the elevator system 100 of FIG. 1.

The test load TL may be selected according to circumstances in a specific elevator installation. Preferably, the test load TL corresponds to a preselected overload, which is represented by a factor OL. Preferably the overload is selected OL=110% i.e. load 10% higher than a nominal load N of elevator car:

$$TL=OL*N,\ \text{preferably}\ TL=110\%*N \quad (1)$$

The method comprises confirming that an empty elevator car 2 is positioned at a test location $s_{test}$, for example at the lowest or highest floor in the elevator hoistway 1.

The method further comprises gathering information of elevator balancing B and friction $F_r$ of an elevator at the test location $s_{test}$.

Balancing B may be a parameter registered into elevator control system. Balancing B may also be checked, for example from equation (5) in WO 2014135408 A1 called as a balancing weight $m_B$. In said equation $m_B=[(P_{ME,mid,up}-P_{ME,mid,dn})\ 2*g*v_{nom}]$ $m_B$ represents the balancing weight difference in kilogram, $v_{nom}$ the nominal speed of the elevator, and g the gravitational acceleration 9.81 m/s$^2$. According to this equation the balance at the middle location of the hoistway is obtained during a constant speed run by determining the motor current from which copper losses are removed in up and down directions and dividing the difference with the nominal velocity and g.

The balance check determines the balancing weight difference of the elevator. The balancing weight difference is the difference between the weight of the empty elevator car 2 and the weight of the counterweight 3 of the elevator. Further, the balancing B may be nominal balancing $B_N$, or it may additionally contain position-dependent uncompensation term U, in addition to the nominal balancing $B_N$:

$$B=B_N+U \quad (2)$$

Uncompensation is the position-dependent compensation error caused by moving components e.g. suspension ropes, hoisting ropes or compensation ropes of the elevator. It may be considered changing linearly as function of elevator car position s, such that nominal balancing $B_N$ is reached in the middle of elevator hoistway 1 for example. In general, the test method can be implemented at any floor or test location but in case the method is implemented at top and/or top floor in the hoistway, then a compensation is not required.

Friction $F_r$ may be measured by moving the elevator car 2 very slowly up and down at the test location $s_{test}$ and measuring motor drive current in both directions. Force/current created by shaft friction (friction of the moving parts in the hoistway) is the calculated by (current upwards-current downwards)/2.

As the aforementioned force components have been determined, the test torque $T_M$, in other words, assisting test torque, of the elevator hoisting motor 5 is determined based on said components TL, B and $F_r$:

$$T_M \rightarrow (OL-B)*N+F_r \quad (3)$$

In equation 3 above, balancing B is expressed as a percentage of nominal load N.

The hoisting machine brakes 7, 7' are tested by opening one of the brakes at a time while keeping rest of the brakes engaged i.e. in their braking position. Torque is then applied, e.g. ramped up with an electrical motor 5 of the elevator hoisting machine 10 at most up to the required test torque $T_M$, while observing motion state of the hoisting machine 10, for example observing movement of the traction sheave 6. If rotation of the hoisting machine 10 is observed, a signal indicating an operational anomaly of the brake or brake system is generated. This indication, preferably with more accurate situation analysis of for example at least one of the following: failed brake combination; statistical information, which torque value caused rotation etc. may be delivered e.g. to a service technician, to a remote monitoring center and/or to a cloud network for diagnosing the brake problem and scheduling maintenance.

Preferably, motor current $I_M$ corresponding to the required test torque $T_M$ is determined, as explained hereinafter. All hoisting machine brakes 7, 7' are opened, hoisting motor 5 is activated, and motor current $I_g$ required to keep elevator car 2 standstill with brakes open is registered. Required test current $I_M$ can then be determined from the current $I_g$, test load TL, balancing B and friction $F_r$, as follows:

$$I_M \rightarrow I_g*[(OL-B)*N/(B*N-F_r)-1] \quad (4)$$

Figure 3:
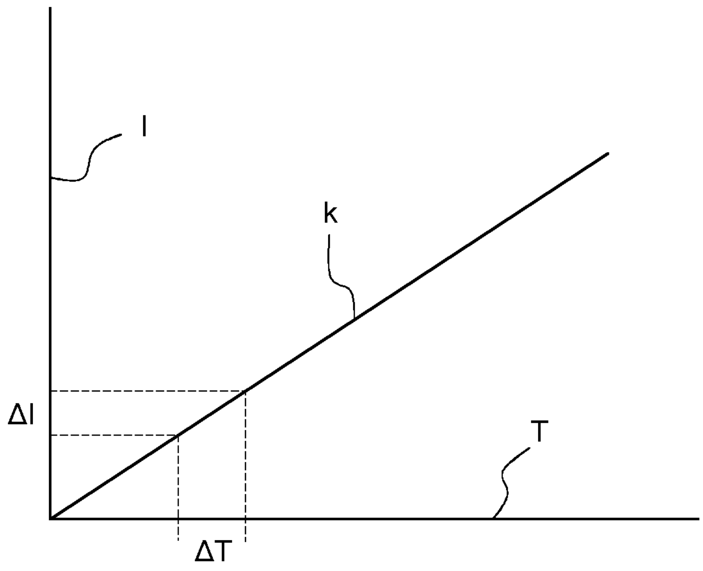
FIG. 3 illustrates a substantially constant relationship between motor current and motor torque in a synchronous permanent magnet motor.

Use of this equation is possible when there is a linear relationship between motor current and motor torque. This is the case especially when hoisting motor is a synchronous permanent magnet motor. FIG. 3 shows an example relating to a synchronous permanent magnet motor wherein said linear relationship is represented by parameter k between motor current I and motor torque T, i.e. a change ΔI in motor current will create change ΔT in motor output torque. Optionally the current to torque rate may be learned by drive.

Then current I at most up to the motor current $I_M$ is supplied to the windings of the hoisting motor 5 to generate the required assisting test torque $T_M$; thereafter the test procedure continues in the same way as disclosed above for the other brakes of the hoisting machine 10.

According to a first example the method is implemented in following circumstances:

- nominal load N=1000 kg and overload factor OL=110%→preselected test load TL=1100 kg
- balancing B=50%
- elevator car 2 is empty
- no compensation error U in test location $s_{test}$
- hoistway friction $F_r$=0
- parameter k=constant.

The brake test load to be verified on test is: 110%×1000 kg−50%×1000 kg=600 kg. In case of one failed brake set 7, 7', remaining brake sets shall be capable of holding and decelerating 110% load. The drive unit 15 measures current $I_g$ required to hold car 2 stationary when the brakes are not engaged. This current $I_g$ represent the force to keep 500 kg stationary. Then one brake set is left open and others are closed. The drive unit 15 increases the current to motor by 0.1×$I_g$ which corresponds to required test force.

- Required test force representing the load of 600 kg< >$I_M$=1.2×$I_g$
- Needed force assistance from motor=600 kg−500 kg=100 kg< >0,2×$I_g$
- $I_M$→$I_g$*[(OL−B)*N/(B*N−$F_r$)−1]<->$I_g$*[(110−50)*1000/(0,5*1000)−1]=$I_g$*0,2

If it is detected that there is no movement on motor traction sheave 6 while test torque is been applied test is passed. Rest of the brake set combinations are tested by following the same procedure.

According to a second example the method is implemented in following circumstances:

- nominal load N=1000 kg and overload factor OL=110%→preselected test load TL=1100 kg
- balancing B=40%
- elevator car 2 is empty
- no compensation error U in test location $s_{test}$
- hoistway friction $F_r$=10 kg
- parameter k=constant.

The brake test load to be verified on test is: 110%×1000 kg−40%×1000 kg=700 kg. In case of one failed brake set 7, 7', remaining brake sets shall be capable of holding and decelerating 110% load. The drive unit 15 measures current $I_g$ required to hold car 2 stationary when the brakes are not engaged. This current $I_g$ represent the force to keep 400 kg stationary minus 10 kg by friction $F_r$. Then one brake set is left open and others are closed. The drive unit 15 increases the current to motor by 0.41×$I_g$ which corresponds to required test force.

- Required test force representing the load of 700 kg< >$I_M$=1.79×$I_g$
- Needed force assistance from motor=700 kg−390 kg=310 kg< >0,79×$I_g$
- $I_M$→$I_g$*[(OL−B)*N/(B*N−$F_r$)−1]<->$I_g$*[(110−40)*1000/(0,4*1000−10)−1]=$I_g$*0,79

If it is detected that there is no movement of elevator car while test torque is been applied test is passed. Rest of the brake set combinations are tested by following the same procedure.

In the application, several details for the arrangement have been presented as preferred. This means that they are preferred, however they are not to be understood as necessary, because it may be that the arrangement can be implemented also without them.

It is to be understood that the above description and the accompanying figures are only intended to illustrate the present invention. It will be obvious to a person skilled in the art that the invention can be varied and modified without departing from the scope of the invention.

The invention claimed is:

1. A method for testing an elevator hoisting machine brake with a preselected test load TL, comprising:

- confirming empty elevator car positioned at a test location $s_{test}$,
- obtaining information of elevator balancing B,
- obtaining information of friction $F_r$ of the elevator at the test location $s_{test}$,
- determining required test torque $T_M$ of a hoisting machine motor based on said test load TL, balancing B and friction $F_r$,
- opening one of the brakes while keeping rest of the brakes engaged in braking position,
- applying torque with the motor at most up to the required test torque $T_M$,
- measuring movement of the elevator car, and
- if movement of the elevator car was detected, generating a signal indicating degraded condition of one or more hoisting machine brakes.

2. The method according to claim 1, wherein the method is repeated for each hoisting machine brake by keeping it open while keeping the rest of the brakes engaged in braking position.

3. The method according to claim 1, wherein the test load TL corresponds to a preselected overload, which is represented by a factor OL as follows TL=OL*N, wherein N is a nominal load N of the elevator car, and preferably OL is selected from range 101% . . . 130%, more preferably 105% . . . 120%, most preferably OL=110%.

4. The method according to claim 1, wherein elevator comprises:

- the elevator car, a counterweight and elevator ropes arranged movably within a hoistway, wherein the elevator car and the counterweight are supported at least partially by means of the elevator ropes; and
- the hoisting machine, which comprises:
  - the hoisting machine motor and a traction sheave connected to the motor for moving the elevator car and the counterweight via the elevator ropes; and
  - at least two brakes, which are arranged to stop and prevent the elevator car from moving when the elevator is stopped.

5. The method according to claim 1, wherein measuring the movement of the elevator car is implemented by measuring rotation of elevator hoisting machine, preferably measuring movement of the motor or a traction sheave for moving the elevator car via the elevator ropes.

6. The method according to claim 1, wherein the motion information of the elevator car is obtained from a rotation sensor or a resolver connected to the motor; or from a positioning device connected to the elevator car or located in the hoistway.

7. The method according to claim 1, wherein the hoisting machine motor is a synchronous permanent magnet motor.

8. A system for implementing the method according to claim 1.

9. The system according to claim 8, which system is a part of the elevator drive unit.

10. The system according to claim 9, wherein the system is implemented in a hardware and/or software module of the elevator drive unit and/or in an elevator maintenance or installation tool.

11. The system according to claim 9, wherein the elevator drive unit comprises an elevator hoisting motor, preferably a synchronous permanent magnet motor, and a frequency converter configured to drive the motor.

12. The system according to claim 9, wherein the system has an input for the motor current fed to the motor and an input for the car location s, the inputs being connectable to the elevator drive unit.

13. The method according to claim 2, wherein the test load TL corresponds to a preselected overload, which is represented by a factor OL as follows TL=OL*N, wherein N is a nominal load N of the elevator car, and preferably OL is selected from range 101% . . . 130%, more preferably 105% . . . 120%, most preferably OL=110%.

14. The method according to claim 2, wherein elevator comprises:

- the elevator car, a counterweight and elevator ropes arranged movably within a hoistway, wherein the elevator car and the counterweight are supported at least partially by means of the elevator ropes; and
- the hoisting machine, which comprises:
  - the hoisting machine motor and a traction sheave connected to the motor for moving the elevator car and the counterweight via the elevator ropes; and
  - at least two brakes, which are arranged to stop and prevent the elevator car from moving when the elevator is stopped.

15. The method according to claim 3, wherein elevator comprises:

- the elevator car, a counterweight and elevator ropes arranged movably within a hoistway, wherein the elevator car and the counterweight are supported at least partially by means of the elevator ropes; and
- the hoisting machine, which comprises:
  - the hoisting machine motor and a traction sheave connected to the motor for moving the elevator car and the counterweight via the elevator ropes; and
  - at least two brakes, which are arranged to stop and prevent the elevator car from moving when the elevator is stopped.

16. The method according to claim 2, wherein measuring the movement of the elevator car is implemented by measuring rotation of elevator hoisting machine, preferably measuring movement of the motor or a traction sheave for moving the elevator car via the elevator ropes.

17. The method according to claim 3, wherein measuring the movement of the elevator car is implemented by measuring rotation of elevator hoisting machine, preferably measuring movement of the motor or a traction sheave for moving the elevator car via the elevator ropes.

18. The method according to claim 4, wherein measuring the movement of the elevator car is implemented by measuring rotation of elevator hoisting machine, preferably measuring movement of the motor or a traction sheave for moving the elevator car via the elevator ropes.

19. The method according to claim 2, wherein the motion information of the elevator car is obtained from a rotation sensor or a resolver connected to the motor; or from a positioning device connected to the elevator car or located in the hoistway.

20. The method according to claim 3, wherein the motion information of the elevator car is obtained from a rotation sensor or a resolver connected to the motor; or from a positioning device connected to the elevator car or located in the hoistway.

* * * * *